J. S. PARKER.
MACHINE FOR TURNING SPOOLS, &c.
No. 32,528. Patented June 11, 1861.
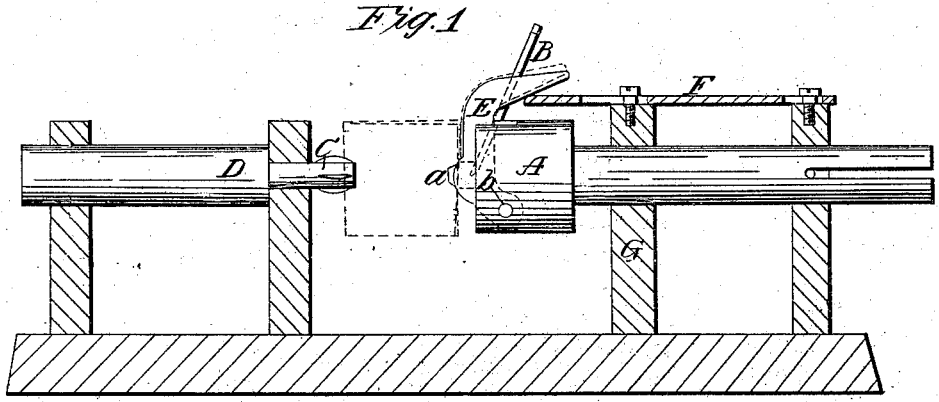
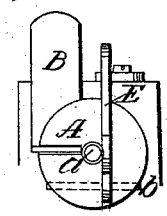
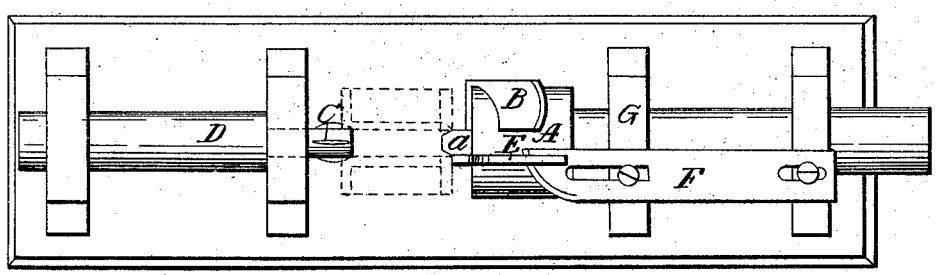
Witnesses:
Inventor:
J. S. Parker
per Munn & Co
Attorneys

UNITED STATES PATENT OFFICE.

J. S. PARKER, OF WEST WILLINGTON, CONNECTICUT.

MACHINE FOR TURNING SPOOLS.

Specification of Letters Patent No. 32,528, dated June 11, 1861.

*To all whom it may concern:*

Be it known that I, J. S. PARKER, of West Willington, in the county of Tolland and State of Connecticut, have invented a new and useful Improvement in Machines for Turning Spools; and I do hereby declare that the following is a full, clear, and exact description of the same, reference being had to the accompanying drawing, forming part of this specification, in which—

Figure 1 represents a longitudinal vertical section of my invention. Fig. 2 is a plan or top view of the same. Fig. 3 is a front elevation of the cutter head.

Similar letters of reference in the three views indicate corresponding parts.

This invention consists in the arrangement of a hinged dog in combination with an adjustable slide and in such relation to the longitudinally sliding cutter head that by the action of said dog, the end of the block is kept clear of the cutter intended to square said end, until by pushing the cutter out, the other end of the block is firmly driven into the spurs of the spur center and a turning of the block independent of said spur center is prevented.

To enable others skilled in the art to make and use my invention, I will proceed to describe its construction and operation with reference to the drawing.

The blocks from which the spools for cotton and other thread are turned, are generally cut of crooked sticks of birches and it is therefore almost impossible to cut the ends off perfectly square. After the hole has been bored through the longitudinal center of the block it is therefore first of all necessary to square off the ends. This object is effected by placing one end of the block on a round center *a* projecting from a cutter head A, to which the cutter B is secured in any convenient manner, and to which a longitudinal sliding motion can be imparted so as to drive the other end of the block into the rotary spur center C projecting from the spindle D. With ordinary machines for this purpose the cutter is liable to catch in the end of the block, before the same is firmly driven into the spurs of the spur center and as the latter revolves it cuts into the wood without imparting to it a rotary motion and the block is spoiled. To overcome this difficulty and to enable the operator to drive the block firmly into the spur center without the liability of its catching in the cutter, is the object of my invention, and I have effected this purpose by means of a dog E, which is secured to the cutter head A by means of a pivot *b* and the front edge of which, when thrown forward, projects beyond the cutter and prevents the same catching in the end of the block. The upper end or shank of the dog E is turned backward and it rests on a slide F, that is secured to the top of the frame G, which supports the cutter head. As the cutter head is drawn back, the shank of the dog by coming in contact with the slide, causes the front edge of the dog to project beyond the cutter thus preventing the latter catching in the block and by means of the dog the end of the block is prevented coming in contact with the cutter until it is firmly driven into the spurs of the spur center. As soon as this is effected, the dog is turned down and the cutter head is pushed out until the cutter comes in contact with the wood and the end is squared without allowing the wood to catch in the cutter or the spur center to turn while the block remains stationary. The slide F is adjustable so that by its aid the position of the dog in relation to the cutter can be regulated at pleasure.

It is obvious that this improvement may be used with advantage for turning other articles similar to spools.

It must be remarked that instead of the hinged dog E and the slide F a sliding rod may be arranged parallel to the sliding cutter head, and so attached to the same that it will project beyond the edge of the sliding cutter until the block has been driven onto the spur center a suitable distance, and then caused to recede from the cutter so that the cutter may come in contact with the block as before described.

Having thus fully described my invention, what I claim as new and desire to secure by Letters Patent is:—

The combination of the projecting dog E or its equivalent with the cutter head A for the purpose described.

J. S. PARKER.

Witnesses:
JOHN B. CARPENTER,
ANDREW H. DAWLEY.